(12) United States Patent
Weiss et al.

(10) Patent No.: US 7,827,683 B2
(45) Date of Patent: Nov. 9, 2010

(54) METHOD FOR FORMING TAPERED PISTON PINS

(75) Inventors: Robert Weiss, Batavia, IL (US);
Stephen Bangs, North Auirora, IL (US);
James Engdahl, Oswego, IL (US); Paul Fecteau, St. Charles, IL (US)

(73) Assignee: Burgess - Norton Mfg. Co., Inc., Geneva, IL (US)

( * ) Notice: Subject to any disclaimer, the term of this patent is extended or adjusted under 35 U.S.C. 154(b) by 1125 days.

(21) Appl. No.: 11/502,115

(22) Filed: Aug. 11, 2006

(65) Prior Publication Data
US 2008/0047125 A1 Feb. 28, 2008

(51) Int. Cl.
*B21K 1/44* (2006.01)
*B23P 13/04* (2006.01)
*F16C 3/04* (2006.01)
*F16C 7/00* (2006.01)
*F16C 11/06* (2006.01)

(52) U.S. Cl. .................. 29/888.05; 29/557; 29/558; 74/579 E; 74/595; 403/150; 403/151; 403/161

(58) Field of Classification Search .................. 29/557, 29/558, 888.05; 74/579 E, 595; 92/187–191; 403/150–151, 161
See application file for complete search history.

(56) References Cited

U.S. PATENT DOCUMENTS

| | | | | | |
|---|---|---|---|---|---|
| 1,722,389 | A | * | 7/1929 | Opie et al. | 29/888.041 |
| 2,150,708 | A | * | 3/1939 | Andrews et al. | 72/338 |
| 3,034,201 | A | * | 5/1962 | Gammon et al. | 29/898.054 |
| 4,359,913 | A | * | 11/1982 | Mahlke | 74/579 E |
| 4,712,941 | A | * | 12/1987 | Emmer | 403/151 |
| 2005/0257374 | A1 | * | 11/2005 | Miki | 29/898 |

* cited by examiner

*Primary Examiner*—David P Bryant
*Assistant Examiner*—Alexander P Taousakis
(74) *Attorney, Agent, or Firm*—Edward J. Brosius

(57) ABSTRACT

A method is provided for cold forming center web or webless tapered piston pins in one forming sequence. The method eliminates secondary operations such as but not limited to machining, annealing, coating and secondary forming.

The method includes the steps of cutting a metal rod into a substantially cylindrical slug piece, die extruding the slug piece to form a first cavity in the slug piece, optionally die extruding the slug piece to form a second cavity in the slug piece, piercing the slug piece to form the slug piece into a hollow cylindrical piece, die extruding the hollow cylindrical piece at either end to form a hollow cylindrical piece having a taper on an internal surface of the hollow cylindrical piece at either end.

9 Claims, 3 Drawing Sheets

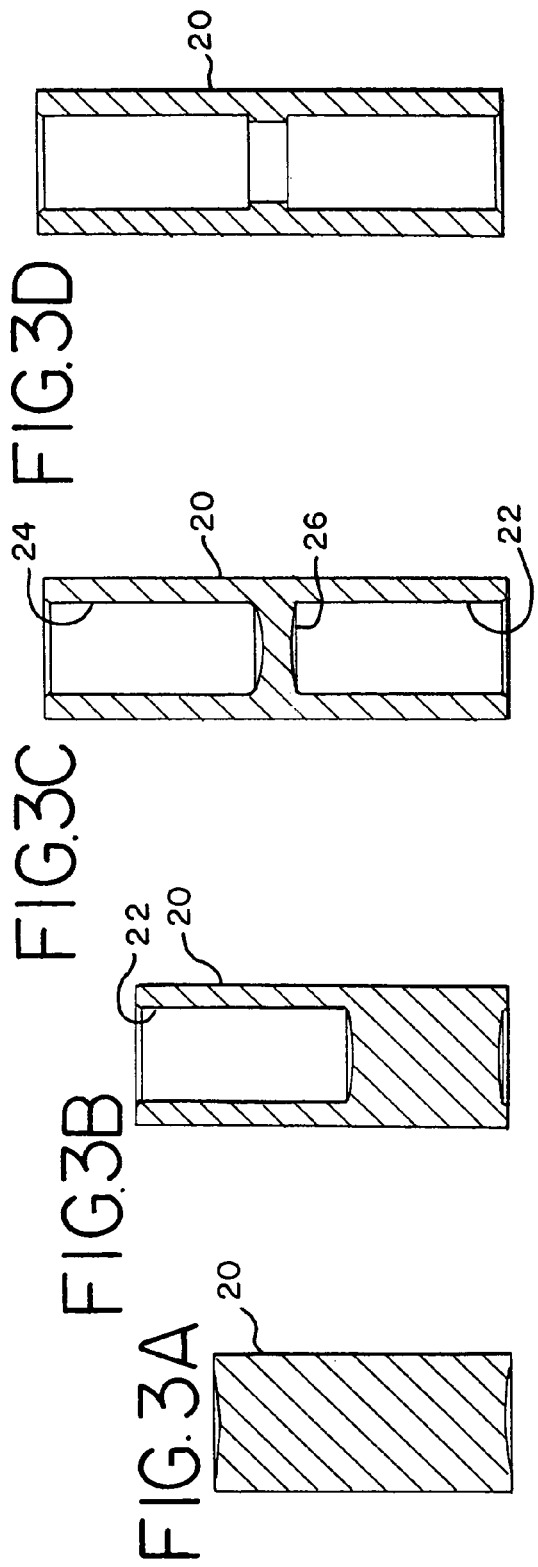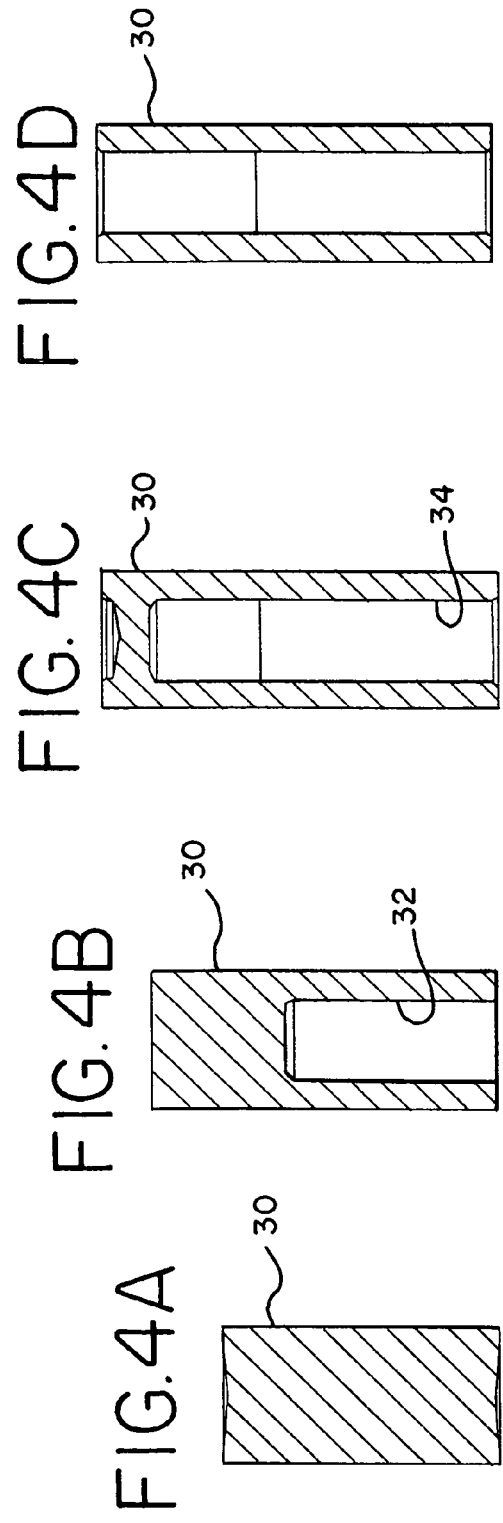

METHOD FOR FORMING TAPERED PISTON PINS

BACKGROUND OF INVENTION

The present invention relates to a method for forming piston pins, and more particularly a method for forming piston pins in one or multiple operations having tapered internal openings. The present invention also includes the tapered piston pin made utilizing this process.

Reciprocating internal combustion engines generally use pistons that oscillate in the cylinder. As illustrated in FIG. 1, the piston 12 functions as a sliding plug that fits closely inside the bore of a cylinder. Essentially, the piston is driven alternately in the cylinder. The burning of a mixture of fuel and air above a piston generates gas pressure from compressed and ignited combustion gases. This pressure forces the piston in a downward direction. As this happens, the piston transmits the force of expanding combustion gases through the piston pin 10 to the connecting rod 14. The piston is attached to the connecting rod, and thus to the crankshaft, transferring reciprocating motion to rotating motion.

Piston pins form an important part of the reciprocating internal combustion engine system. Each piston pin extends through aligned openings in the piston and the connecting rod, to establish a pivotal connection between the rod and the piston. As the engine crankshaft rotates, one end of each connecting rod orbits around the crankshaft axis. The other end of the connecting rod has swivel motion around the pin within the piston, whereby each piston delivers power through the connecting rod to the crankshaft. Each piston pin serves as a pivotal connection between the connecting rod and piston.

The forces imposed on the piston, piston pin and connecting rod from combustion are enormous. In addition, piston assemblies (pistons, piston pins and the connecting rods discussed above) account for a large amount of the friction losses in an engine's performance. There is a trend in engine design to reduce the reciprocating mass of the piston assembly including the crankshaft. Thus performance can be enhanced by having a lighter piston pin, which reduces inertial losses, thereby improving engine efficiency. Accordingly, being lightweight is an essential characteristic of an effective piston pin and piston assembly. In addition, the ideal piston pin possesses other important characteristics: wear resistance, rigidity and high strength for withstanding the extreme forces that result from the combustion process. One method of reducing the weight of the piston pin is to reduce the mass at the ends of the internal diameters of the pin by creating an outwardly tapered internal portion.

Certain piston pins are formed with a center web near the middle of the pins as illustrated in FIG. 3. These piston pins are referred to as center webbed, two way extruded or two way formed piston pins. Other piston pins carry weight reduction even further by forming the web on the end of the pin as illustrated in FIG. 4. In this method the web is completely removed for further mass reduction benefits. These pins are commonly referred to as webless, end web, one way extruded or one way formed piston pins. Both piston pin manufacturing methods can also be designed to have tapered bores to reduce weight. Current art is to machine the internal taper into the pin or to extrude a taper into the internal portion of a center web pin. Additionally, some tapers will be added to one way formed pins by adding the tapers in the internal portion through secondary machining or forming operations. These additional operations may include any combinations of annealing, lubrication applications, and secondary forming operations. None of these methods are cost effective nor optimize weight reduction. All of these methods are very expensive.

As stated above, the prior art suffers various deficiencies relating to low efficiency, high costs and sub-optimal weight reduction. There is a need for a cost effective manufacturing method to form center web or webless tapered piston pins in one forming sequence of a machine. In addition, there is a need for an improved and more economical method for forming internal tapers on a piston pin.

SUMMARY OF THE INVENTION

There is a need in current reciprocating internal combustion engine systems for a method to economically manufacture center web or webless tapered piston pins with lightweight and high strength. In accordance with the present invention, a method is provided for manufacturing cold formed tapered center web or webless piston pins in an efficient and cost effective process approach. The invention eliminates secondary operations performed individually or in combination such as machining, coating and secondary forming. In another aspect of the present invention, piston pin tapers are formed at greater angles and lengths thereby further enhancing weight reduction than those of the prior art.

BRIEF DESCRIPTION OF THE DRAWINGS

In the drawings,

FIG. 3 is a pictorial drawing representing an exemplary two-way center-web extrusion method of manufacturing tapered piston pins, and FIG. 4 is a pictorial drawing representing an exemplary one-way webless extrusion method for manufacturing tapered piston pins.

DETAILED DESCRIPTION OF DRAWINGS

FIGS. 3 and 4, views A through D, illustrate typical processes of manufacturing piston pins. These processes begin with bar or coil steel. Generally, carbon steel wire is used for reasons relating to carbon steels' physical and mechanical properties that are attractive for forming piston pins as well as providing the necessary characteristics to the end product cost effectively. Nonetheless, alternative metals could also be used depending on the application involved. The metal wire is unrolled and straightened. After exiting the unrolling machine, the metal coil is cut into separate pieces. These pieces are shaped roughly cylindrical. Next, the pieces are prepared for the extrusion processes. Depending on the specifications required by the customer, tapering of piston pins may be required. The tapering process will be further described with reference to subsequent figures.

With reference to FIG. 3, a typical two-way/center-web extrusion forming sequence relating to the manufacturing of a piston pin is illustrated. Anyone familiar with cold forming understands that this is only an example of how to form a piston pin. The purpose of this invention is to use this only as an example and the invention applies to all methods of forming tapers in a tubular extruded blank.

With reference to FIG. 4, a one-way/end-web extrusion forming sequence relating to the manufacturing of a piston pin is illustrated. Anyone familiar with cold forming understands that this is only an example of how to form a piston pin. The purpose of this invention is to use this only as an example and the invention applies to all methods of forming tapers in a tubular extruded blank.

Figure 1:
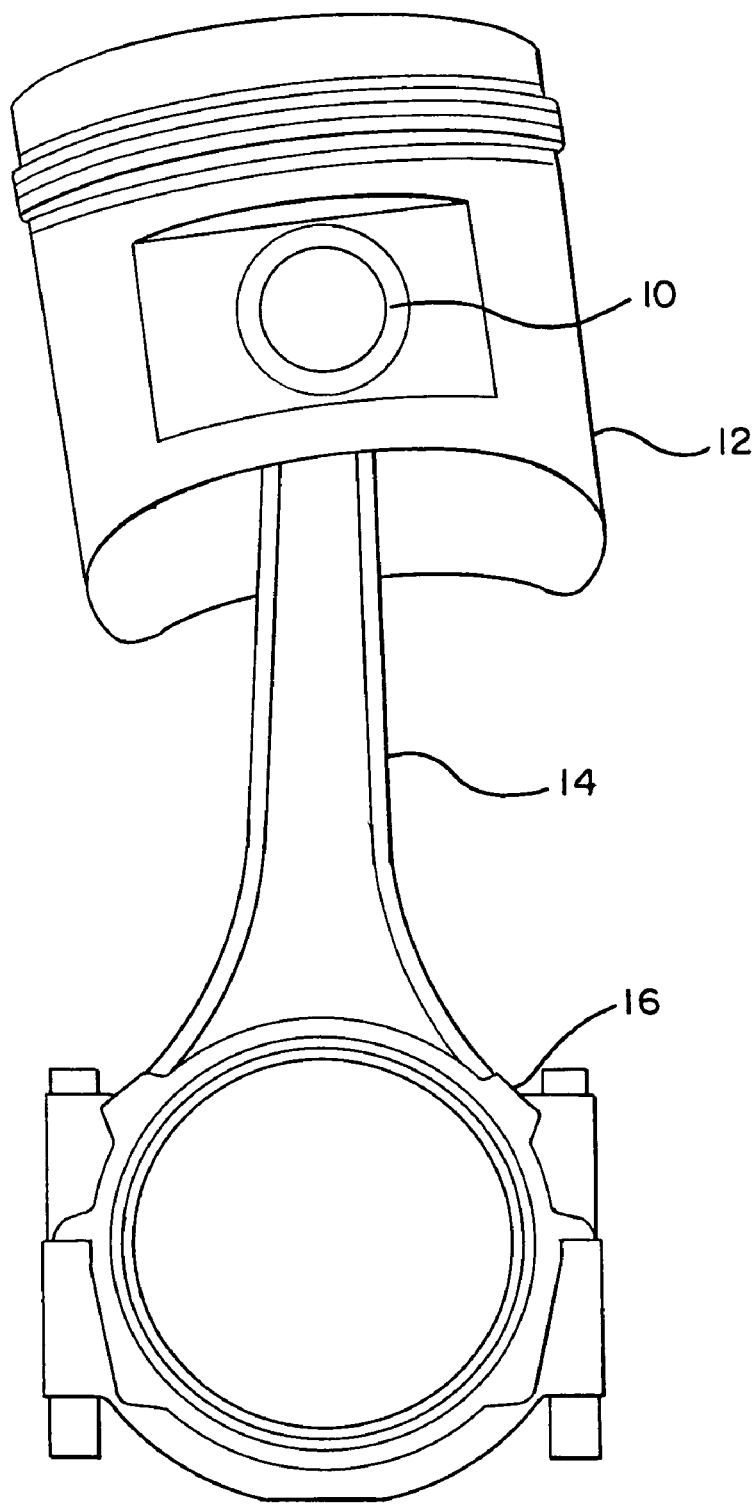
FIG. 1 is a front view of a piston system with the piston pin pivotally connected between a connecting rod and a piston.
Figure 2A:
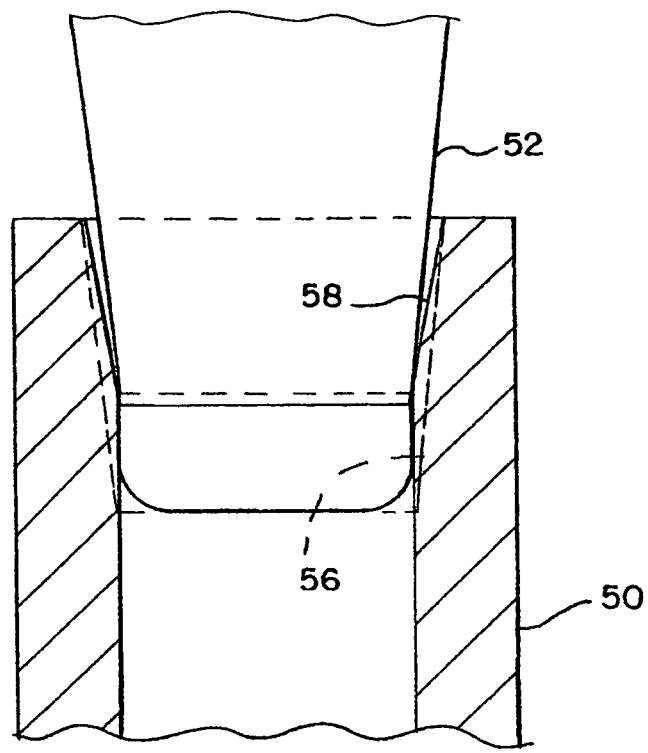
FIG. 2A is a pictorial drawing of a wider included angle in the first taper forming operation showing the next station punch at the initial contact point.

Referring now to FIG. 2A, from the tubular formed blank, item 50, the invention demonstrates the forming operation for developing a taper in both ends of the inner portion of the piston pin blank. This figure reflects the forming of the taper to a larger included angle, item 58, than the finished requirement, item 52, at a predetermined length which would be shorter or equal to the finished taper length in the axial direction of the piston pin. The ultimate finished contour is shown at 56. This is only an example. Anyone familiar with forming technology understands that this could be completed in one or multiple stations, but this invention focus' on the most cost effective method of forming tapers in the inner portion of a tubular blank. However, the intent of this invention is to cover all multiple sequences of forming tapers in the inner portion of a tubular blank.

Figure 2B:
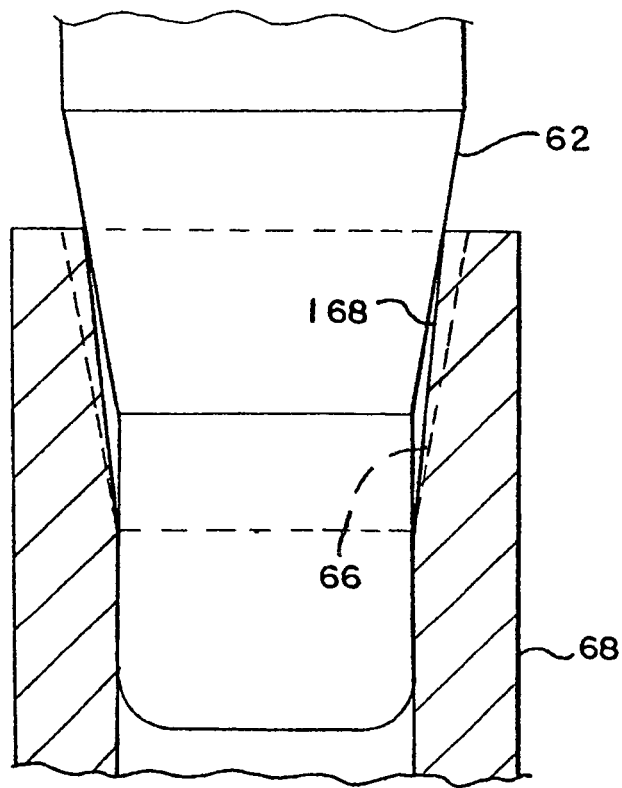
FIG. 2B is a pictorial drawing of a narrower included angle in the first taper forming operation showing the next station punch at the initial contact point.

FIG. 2B is an example of forming the piston pin to the finished requirements from a blank, item 68, from a previous taper forming operation. This figure shows the finishing tool, item 62, above a previously former tapered blank wall 168. The ultimate finished contour is shown at 66. Anyone familiar with forming technology understands that this could be completed in one or multiple stations, but this invention focus' on the most cost effective method of forming tapers in the inner portion of a tubular blank.

The above-described method for tapering piston pins is an example implementation. The method illustrates one possible approach for forming tapers in piston pins, without the need for an expensive machining, coating or additional forming processes. The actual implementation may vary from the arrangement discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive. Therefore, the scope of the invention is not limited to the specific exemplary embodiment described above. All changes or modifications within the meaning and range of equivalents are intended to be embraced herein.

What is claimed is:

1. A method for manufacturing a tapered piston pin comprising the steps of:
    providing a solid cylindrical piece of steel,
    inserting an initial punch into one end of the cylindrical piece,
    wherein the initial punch forms a taper at a preselected acute angle to an inside surface of the cylindrical piece, and
    inserting a following punch into the end of the hollow cylindrical piece, wherein the following punch forms a second taper at a second preselected acute angle to an inside surface of the hollow cylindrical piece to form a hollow cylindrical piece having a dual tapered internal surface of the hollow cylindrical piece.

2. The method of claim 1,
    wherein the second preselected acute angle of the second taper is less than the first preselected acute angle of the first taper.

3. The method of claim 1,
    wherein the second preselected acute angle of the second taper is greater than the first preselected acute angle of the first taper.

4. A method for manufacturing a tapered piston pin comprising the steps of:
    cutting a solid cylindrical steel rod into a substantially cylindrical slug piece, having two ends,
    die extruding the slug piece to form a first cavity at one end of the slug piece,
    die extruding the slug piece to form a second cavity at the other end of the slug piece,
    piercing the slug piece to form the slug piece into a hollow cylindrical piece,
    die extruding the hollow cylindrical piece at either end to form a hollow cylindrical piece having a taper on an internal surface of the hollow cylindrical piece at either end, and inserting a first die punch into one end of the hollow cylindrical piece,
    wherein the first die punch forms a first taper at a first acute angle to an inside surface of the hollow cylindrical piece, and then inserting a second die punch into first end of the hollow cylindrical piece, wherein the second die punch forms a second taper at a second preselected acute angle to an inside surface of the hollow cylindrical piece.

5. The method of claim 4,
    wherein the second preselected acute angle of the second taper is less than the first preselected acute angle of the first taper.

6. The method of claim 4,
    wherein the second preselected acute angle of the second taper is greater than the first preselected acute angle of the first taper.

7. A method for manufacturing a tapered piston pin comprising the steps of:
    providing a slug piece and piercing the slug piece to form the slug piece into a hollow cylindrical piece,
    die extruding the hollow cylindrical piece at either end to form a hollow cylindrical piece having a hollow cylindrical piece having a tapered length of an internal surface of the hollow cylindrical piece at either end,
    inserting a first die punch into one end of the hollow cylindrical piece, wherein the first die punch forms a first taper at a first preselected acute angle to an inside surface of the hollow cylindrical piece, and inserting a second die punch into the one end of the hollow cylindrical piece, wherein the second die punch forms a second taper at a second preselected acute angle to an inside surface of the hollow cylindrical piece.

8. The method of claim 7,
    wherein the second preselected acute angle of the second taper is less than the first preselected acute angle of the first taper.

9. The method of claim 7,
    wherein the second preselected acute angle of the second taper is greater than the first preselected acute angle of the first taper.

* * * * *